E. SALAY.
SAUSAGE HANGING TOOL.
APPLICATION FILED NOV. 24, 1915.
1,182,322.
Patented May 9, 1916.
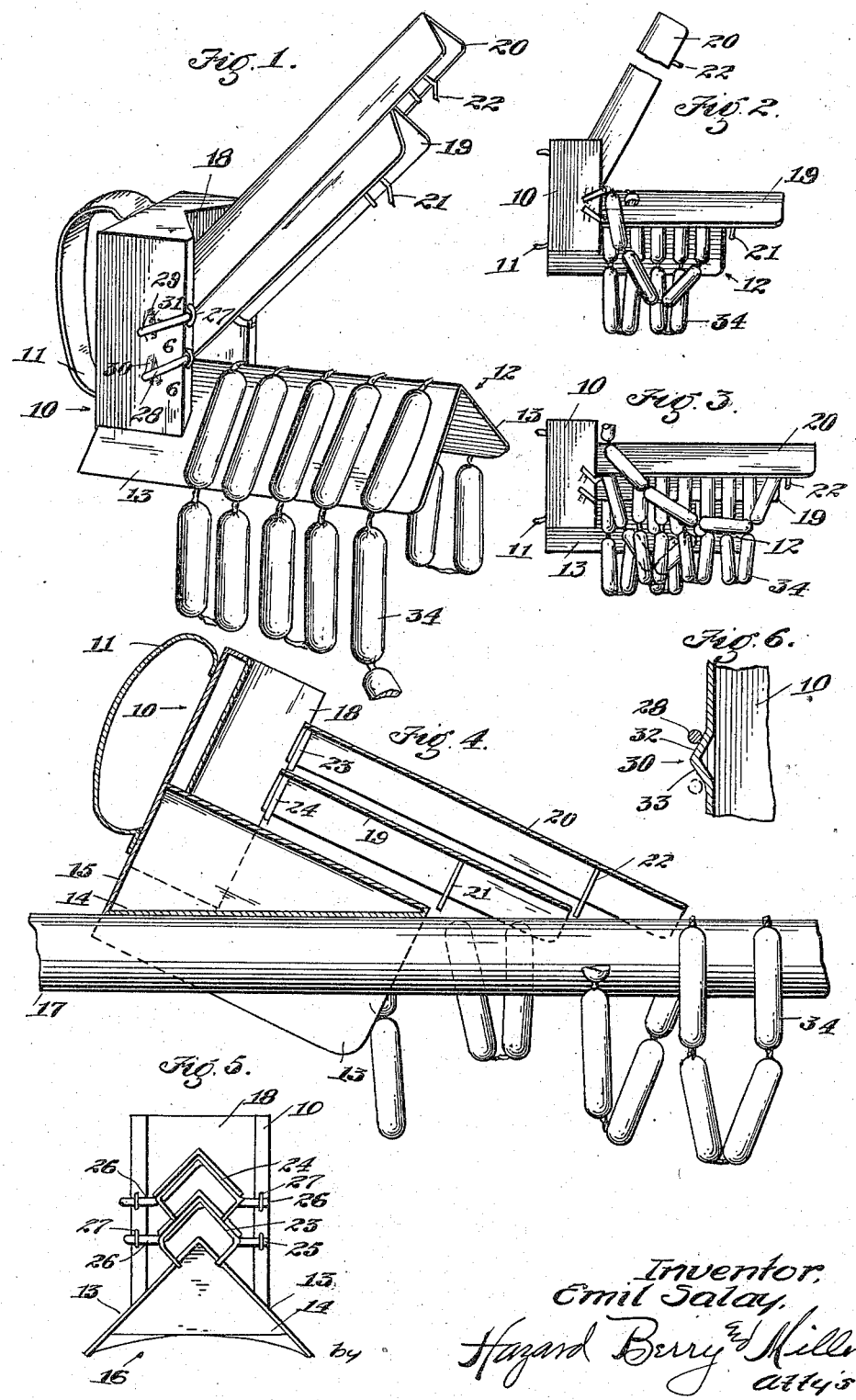
Inventor,
Emil Salay,
by Hazard Berry & Miller
atty's

UNITED STATES PATENT OFFICE.

EMIL SALAY, OF POMONA, CALIFORNIA.

SAUSAGE-HANGING TOOL.

1,182,322.  Specification of Letters Patent.  Patented May 9, 1916.

Application filed November 24, 1915. Serial No. 63,348.

*To all whom it may concern:*

Be it known that I, EMIL SALAY, a subject of the King of Hungary, residing at Pomona, in the county of Los Angeles and State of California, have invented new and useful Improvements in Sausage-Hanging Tools, of which the following is a specification.

This invention relates to a sausage hanging tool.

It is the object of this invention to provide a device for facilitating the hanging of sausages and the like, as in arranging them on the smoke house bars.

It has heretofore been the general custom in stringing sausages and the like on smoke house bars, for the workman to arrange the sausage links across his fore-arm in transferring them to the bars. This method is objectionable in that the cold sausages chill the arm and is therefore injurious to the workman. Furthermore, it is not desirable that the sausages contact the flesh of the workman for hygienic reasons. This method is also objectionable in that considerable time and labor is required in thus handling the sausages.

It is another object of this invention to provide a device which will obviate the above objections and which will enable the handling of the sausages with greater ease and rapidity.

A further object is to provide a device of the above character which embodies a portable rack adapted to receive and carry a long string of sausages folded in short lengths within a compact space and so constructed that the sausages may be readily rove thereon and quickly transferred to the smoke bar.

The invention is illustrated in the accompanying drawings in which:

Figure 1 is a view in perspective illustrating the device in its normal position and showing the manner of arranging a layer of sausage links thereon. Fig. 2 is a detail side elevation showing the device as disposed in arranging a second layer of sausages thereon. Fig. 3 is a side elevation showing the device as loaded with sausages. Fig. 4 is a detail section and elevation illustrating the manner of transferring sausages from the device to the smoke bar. Fig. 5 is a view of the device in end elevation. Fig. 6 is a detail in section and elevation on the line 6—6 of Fig. 1, showing the construction of the arm locking mechanism.

More specifically, 10 indicates the body portion of the device which forms a support or mounting for the various elements thereof. This body portion 10 has a handhold 11 formed thereon by means of which the device may be readily grasped and carried in the hand. Extending outwardly from the under side of the body portion 10 is a bracket 12 formed of downwardly divergent spreader plates 13 over which a string of sausages is adapted to be suspended, as shown in Fig. 1, in such manner that the links of the sausages depending below the lower edges of the spreader plates will be spaced apart. The spreader plates are connected together at their under side by a diagonally arranged plate 14, as shown in Fig. 4, and are further connected together by an end plate 15 formed in continuation of the rear wall of the body member 10. This plate 15 is cut away at its lower edge below the wall 14 in the form of an arc, as indicated at 16 in Fig. 5. This construction permits of the spreader plates 13 being placed astride of the smoke bar 17, as shown in Fig. 4, with the plate 14 seated thereon, thus arranging the upper edge of the bracket 12 at an inclination in relation to the smoke bar, as shown in Fig. 4.

The outer face of the body member 10 is formed with a recess 18 and pivotally mounted on the forward edges of the body member 10 on the opposite sides of the recess 18 is a pair of super-posed arms 19 and 20 adapted to be swung vertically toward and away from the bracket 12. The arms 19 and 20 are formed of divergent plates arranged so that when the arms are in their lowermost positions adjacent the bracket 12 the plates of the arm 19 will extend on opposite sides of the bracket and the plates of the arm 20 will extend over the plates of the arm 19. Formed on the under side of the arm 19 are projections 21 arranged to extend adjacent the outer end of the bracket 12 when the arm 19 is in its lowermost position to prevent the sausages carried on the bracket 12 from slipping off the end thereof. Similar projections 22 are formed on the arm 20 to extend adjacent the end of the arm 19.

The arm 19 is of a length greater than the bracket 12 so as to project beyond the outer end of the latter and the arm 20 is likewise of greater length than the arm 19 so as to project therebeyond. By this arrangement, when the bracket 12 is placed on the bar, as shown in Fig. 4, the outer ends of the arms 19 and 20 will be disposed close to the bar so that the links of sausages in passing from the arms will slide on to the bar without jar, thus avoiding danger of separating adjacent links of the sausage.

The mountings of the arms 19 and 20 consist of V-shaped rods 23 and 24 on which the inner ends of the plates forming the arms 19 and 20 are rigidly mounted. The V-shaped rods 23 and 24 have outwardly extending end portions 25 and 26 which are pivoted in suitable bearings 27 carried on the body member 10.

Means are provided for holding the arms 19 and 20 in their uppermost position independent of each other. This means consists in forming latch members 28 and 29 on the end portions 26 of the rods 23 and 24, as shown in Fig. 1; the latch members 28 and 29 extending alongside of the side wall of the body member 10 and adapted to ride over and engage the opposite sides of keepers 30 and 31. The keepers 30 and 31 are formed with oppositely inclined walls 32 and 33, as particularly shown in Fig. 6, which extend in the path of travel of the latches 28 and 29 in such manner that when the latches are arranged on the under side of the keepers adjacent the faces 32 thereof, the arms 19 and 20 will be held in their uppermost positions against easy displacement. A downward pressure on the arms 19 and 20 causes the latches to ride over the keepers into engagement with the upper face 33 to hold the arms in their lowermost position against ready displacement.

In the operation of the invention the arms 19 and 20 are disposed in their uppermost position, as shown in Fig. 1. A string of sausages 34 is then arranged across the spreader plates 13 of the bracket 12, as shown in Fig. 1; the sausages being placed on the spreader plates by roving the string of sausages back and forth from one side of the bracket to the other with a series of the sausage links supported on the spreader plates and their connecting links depending below the lower edges thereof. The end of the sausage string is started adjacent the body member 10 of the device and is continued throughout the length of the bracket 12, whereupon the arm 19 is disposed in its lowermost position, as shown in Fig. 2. When in this position the plates forming the arm 19 will be supported upon the lower row of sausages and the projections 21 will extend adjacent the outer end of the bracket 12 and serve to prevent the sausages from slipping off the end of the bracket 12. The sausage string is then carried back and over the rear end of the arm 19 and again linked thereon from its inner toward its outer end in the same manner as on the bracket 12. When the arm 19 is thus loaded with the sausages the arm 20 is disposed in its lowermost position with its divergent plates resting on the sausages carried by the arm 19 and the projections 22 extending adjacent the outer end of the arm 19. The sausage string is then carried from the outer end of the arm 19 to the rear end of the arm 20 and passed back and forth over the arm 20 from its rear end toward its forward end. The arm 19 is of such length in relation to the arm 20 that the length of the chain of sausages extending from the outer end of the arm 19 to the inner end of the arm 20 will not necessarily have to be greater than the length of the loop of the sausage links extending over the sides of the arms or bracket; it being desirable that the lengths of the loops of sausages be approximately equal throughout so that when the sausages are placed on the bar 17 they will depend therefrom substantially corresponding distances on the opposite sides thereof. In thus loading the device it may be disposed on any suitable support and when filled may be lifted by grasping the body member 10 or hand-hold 11 and carried to any desired point of delivery of the sausages.

In transferring the sausages from the device to the bar 17 the spreader plates 13 are arranged astride the bar 17 with the plate 14 seated on the latter, as shown in Fig. 4. If the bar 17 be horizontal, the arms 19 and 20 and the bracket 12 will be disposed at an inclination. The links of sausages depending from the opposite sides of the spreader plates 13 will be arranged on the opposite sides of the bar 17, whereupon the sausages are discharged from the arm 20 on to the bar, arranging them in loops astride the latter. The arm 20 is then raised to its uppermost position where it is retained by the latch 29 engaging the keeper 31 and the sausages removed from the arm 19 which, when cleared, is elevated to its uppermost position to permit the ready removal of the sausages from the bracket 12.

The device may be constructed of any suitable material but is here shown as formed of sheet metal which is more desirable in that cheapness of construction and lightness can thereby be obtained. In practice any number of the pivoted arms 19 and 20 may be employed, as occasion may desire, and in some instances they may be dispensed with, their use, however, being essential where it is desired to provide a long supporting surface in a compact space.

What I claim is:

1. A sausage hanging device, comprising a sausage supporting bracket, an upwardly projecting body member thereon, and a pivoted arm on said body member arranged to extend over and project beyond the outer end of the bracket.

2. A sausage hanging device, comprising a bracket, an upwardly projecting body member thereon, a pivoted arm on said body member arranged to extend over and project beyond the outer end of the bracket, and means for latching said arm in an elevated position.

3. A sausage hanging device, comprising a body member, and a sausage supporting bracket extending from said body member having downwardly divergent flat side portions spaced apart at their lower edges to form a longitudinal channel on its under side.

4. A sausage hanger, comprising a pair of downwardly divergent flat plates forming a sausage supporting and spreading bracket, and a hand-hold for carrying said plates.

5. A sausage hanging device, comprising a body member, a bracket thereon formed with downwardly divergent sides, an arm pivoted on the body member to extend over the bracket, having divergent sides, and means for automatically latching the arm in an elevated position.

6. A sausage hanging device, comprising a body member, a bracket thereon formed with downwardly divergent sides, an arm pivoted on the body member to extend over the bracket, having divergent sides, and means for latching the arm in its elevated position and adjacent the bracket.

7. A sausage hanging device, comprising a body member, a bracket thereon, a pivoted arm arranged to extend over the bracket, and projections on the under side of said arm adapted to extend adjacent the outer end of the bracket when the arm is in its lowermost position.

8. A sausage hanging device, comprising a body member, a bracket thereon, a pivoted arm arranged to extend over the bracket, projections on the under side of said arm adapted to extend adjacent the outer end of the bracket when the arm is in its lowermost position, and means for latching the arm in its elevated and lowermost position.

9. A sausage hanging device, comprising a body member, a bracket thereon having divergent side members and a diagonal supporting plate on its under side, an arm pivoted to the body member adapted to extend longitudinally of the bracket and to project therebeyond, a projection on the under side of said arm arranged to extend adjacent the end of the bracket, a second pivoted arm arranged to extend above the first-named arm and of a length to project beyond the outer end of the arm therebeneath, and means for latching said arms in an elevated position.

10. A sausage hanging device, comprising a bracket formed of divergent plates, and a pivoted arm extending over said bracket.

11. A sausage hanging device, comprising a bracket formed of a pair of downwardly divergent plates, an end wall connecting said plates, and a hand-hold connected to said wall.

12. A sausage hanging device, comprising a bracket, formed of a pair of downwardly divergent plates, an end wall connecting said plates, a hand-hold connected to said wall, and a diagonal plate connecting the divergent plates and the end wall.

13. A sausage hanging device, comprising a body member, a bracket extending from said body member having downwardly divergent side portions, and an arm extending longitudinally over said bracket.

14. A sausage hanging device, comprising a body member, a bracket extending from said body member having downwardly divergent side portions, and a pivoted arm extending longitudinally over said bracket and projecting beyond the outer end thereof.

In testimony whereof I have signed my name to this specification.

EMIL SALAY.